(No Model.)

A. EDWARDS.
CAR FENDER.

No. 539,042. Patented May 14, 1895.

WITNESSES:
D. Petri-Palmedo
F. J. Machalske

INVENTOR
A. Edwards
BY Oscar F. Gunz
his ATTORNEY.

United States Patent Office.

ALBERT EDWARDS, OF BROOKLYN, NEW YORK.

CAR-FENDER.

SPECIFICATION forming part of Letters Patent No. 539,042, dated May 14, 1895.

Application filed February 9, 1895. Serial No. 537,809. (No model.)

*To all whom it may concern:*

Be it known that I, ALBERT EDWARDS, a citizen of the United States, and a resident of Brooklyn, in the county of Kings and State of New York, have invented certain new and useful Improvements in Car-Fenders, of which the following is a specification.

The object of my invention is to provide a new and improved fender for electric, cable and other motor cars, which fender is so constructed that it catches and holds the persons struck by it and prevents their falling off the fender and which fender when not in use can be folded snugly under the car.

The invention consists in a car fender formed of a frame pivoted between two side bars projecting forward from under the car platform and a flexible piece forming a pocket and having its front edge secured to the rear edge of said frame and its rear edge secured to the front of the car platform.

The invention also consists in the construction and combination of parts and details as will be fully described and set forth hereinafter and finally pointed out in the claims.

Figure 1:
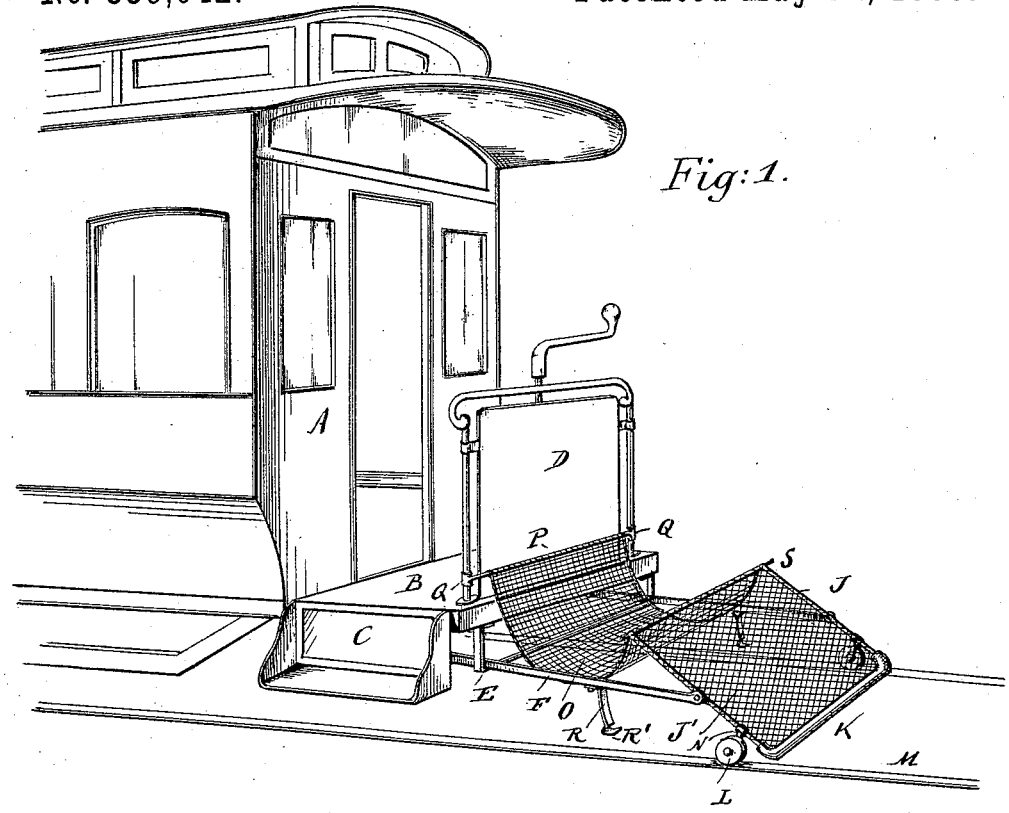
Figure 2:
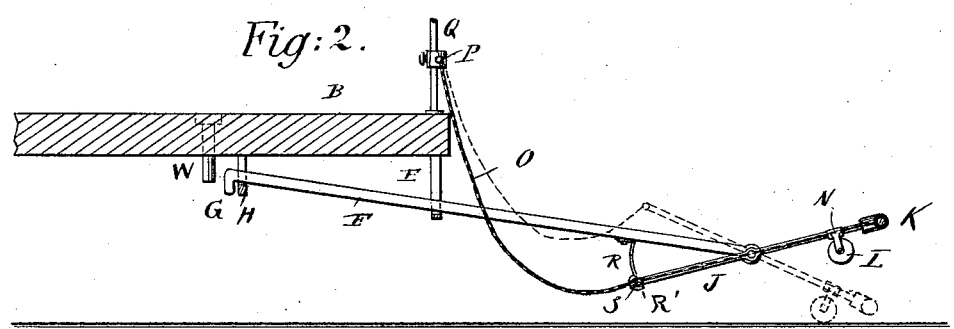
Figure 3:
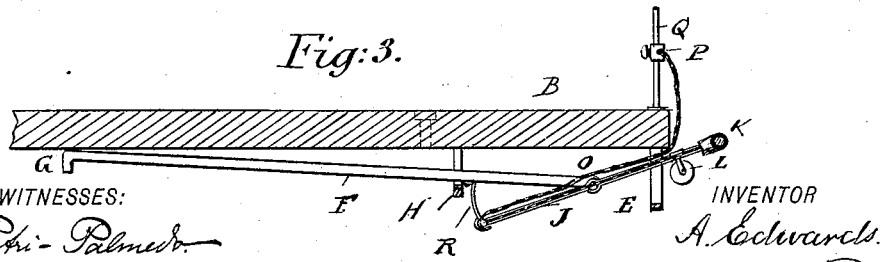

In the accompanying drawings, forming a part of this specification, and in which like letters of reference indicate like parts in all the views, Figure 1 is a perspective view of one end of a car provided with my improved fender. Fig. 2 is a vertical longitudinal sectional view of the fender extended, parts of the car being also shown in section. Fig. 3 is a similar view showing the fender folded under the car-platform.

The car A, which may be of any approved construction, is provided in the usual manner with the end-platform B, the steps C and the dash boards D. A U shaped frame E, is fastened on the under side of the platform B at the front or outer edge of the same and extends downward. On the same a side bar F, rests at each end of said frame, the inner ends of said side bars being provided with downwardly projecting heads or hooks G, which, when said side bars are drawn out, as shown in Figs. 1 and 2, rest against the rear sides of slotted lugs H fastened to and projecting downward from the under side of the platform or car floor and which lugs limit the forward movement of the side bars and also support the inner ends of the side bars when the same are pushed inward as shown in Fig. 3. A rectangular frame J, covered with wire netting J' preferably made elastic like the woven wire mattress supports or spring beds, is pivoted at the centers of its end pieces between the forward ends of the side bars F, so as to swing freely between the same. A rubber cushion K or a cushion or roll of padded leather is fastened to the front bar of said frame J, so as to break and deaden the shock when a person is struck.

A wheel L, which can run on the car tracks M is mounted on a small arm N projecting from each side bar of the frame J, near the front lower end of the same, so as to form a support for the front part of said frame when it is in its lowered normal position, as shown in Fig. 1, and in dotted lines in Fig. 2.

A piece O of flexible wire netting or rope netting, if desired, is secured at its front edge to the upper rear bar of the frame J and at its rear edge to the cross bar P fastened at its ends to the end posts Q of the dash board D, slightly above the bottom of said dash board.

A suitable stop is provided on each side bar F, to prevent the inner end of the frame J from swinging downward too far and the same preferably consists of a downwardly extending spring arm R, provided at its lower end with a projection R' on which a pin S, projecting sidewise from the upper rear end of the frame J can catch, there being a pin S, at each end of said frame J. As the rear upper end of the frame J swings downward, the pins S press the arms R slightly to the rear until said pins rest on the hooks R' when the springs snap to the front slightly and engaging the pins S, lock the frame J in position as shown in full lines in Fig. 2.

Stop lugs W, are provided against which the inner ends of the bars F can rest when pulled out so as to prevent the bars being pushed inward when a person is struck by the fender.

Normally the fender is in the position shown in Fig. 1, the front of the frame J, being held lowered by its own weight so that the cushion K is slightly above the tracks M and the wheels L run on the tracks, the netting O forming a pocket behind the downwardly and forwardly inclined frame J, and between the bars F.

If a person is struck by the fender and drops or is thrown upon the same, the rear end of the frame J swings down under the weight of said person, into the position shown in Fig. 2, in full lines and is locked in this position in the manner shown and described. The netting O, with the frame J, now forms an enlarged pocket in which the person rests and which holds him clear from the ground and prevents any part of his body coming in contact with the wheels or any part of the car, excepting the dash board. After the person has been removed from the fender the front end of the frame J is forced down into normal position again.

When the fender is not in use the front of the frame J is raised as shown in full lines in Figs. 2 and 3, and the folded frame J and netting O, are pushed under the platform B and the side bars F, are pushed inward as shown in Fig. 3 so that the fender is entirely out of the way.

When the fender is to be used again it is only necessary to pull the same and the side bars F, outward and to swing down the front end of the frame J.

Having thus described my invention, what I claim as new, and desire to secure by Letters Patent, is—

1. In a car fender, the combination with bars projecting from the end of the car, of a frame pivoted between the outer ends of said bars, a flexible piece secured at its front edge to the rear edge of said frame and at its rear edge to the front of the car platform, and means for preventing the inner end of said pivoted frame from descending too far and for locking said inner end in lowered position substantially as herein shown and described.

2. In a car fender, the combination with bars, suspended below the car platform and mounted to slide under said platform, of means for preventing said bars from sliding outward too far—a frame pivoted between the outer ends of said bars, a flexible piece secured at its front edge to the rear edge of said frame and at its rear edge to the front of the car platform, substantially as herein shown and described.

3. The combination, with a car, of a U shaped support secured to the under side of the platform at the outer end thereof, slotted lugs on the under side of the car, some distance inward from said support, sliding bars resting in said lugs and on said support, a frame pivoted between the outer ends of said bars a flexible piece secured to the inner rear edge of said frame, and to the front of the car platform, substantially as herein shown and described.

In testimony that I claim the foregoing as my invention I have signed my name, in presence of two witnesses, this 7th day of February, 1895.

ALBERT EDWARDS.

Witnesses:
OSCAR F. GUNZ,
N. M. FLANNERY.